United States Patent
Haruna

(10) Patent No.: US 7,232,121 B2
(45) Date of Patent: Jun. 19, 2007

(54) CLAMPING DEVICE

(75) Inventor: Yosuke Haruna, Kobe (JP)

(73) Assignee: Kosmek Ltd. (JP)

( * ) Notice: Subject to any disclaimer, the term of this patent is extended or adjusted under 35 U.S.C. 154(b) by 121 days.

(21) Appl. No.: 10/523,404

(22) PCT Filed: Jul. 7, 2003

(86) PCT No.: PCT/JP03/08630

§ 371 (c)(1),
(2), (4) Date: Feb. 3, 2005

(87) PCT Pub. No.: WO2004/012902

PCT Pub. Date: Feb. 12, 2004

(65) Prior Publication Data

US 2006/0055099 A1    Mar. 16, 2006

(30) Foreign Application Priority Data

Aug. 6, 2002  (JP) .............................. 2002-228447

(51) Int. Cl.
B23Q 3/00    (2006.01)
(52) U.S. Cl. .................................... 269/309
(58) Field of Classification Search ................ 269/309, 269/310, 48.1, 234, 32; 198/345; 228/49.3
See application file for complete search history.

(56) References Cited

U.S. PATENT DOCUMENTS 6,527,266 B1    3/2003  Yonezawa et al.

FOREIGN PATENT DOCUMENTS

| EP | 1 078 713 A1 | 2/2001 |
| EP | 1 264 658 A | 12/2002 |
| JP | 7-314270 A | 12/1995 |
| JP | 8-155770 A | 6/1996 |
| JP | 11-333649 A | 12/1999 |

*Primary Examiner*—Robert C. Watson
(74) *Attorney, Agent, or Firm*—Bacon & Thomas PLLC

(57) ABSTRACT

An annular plug portion (21) projects from a clamp pallet (2). An annular shuttle member (23) is supported by the plug portion (21) to be movable in the vertical direction. A work pallet (3) is provided with a tapered inner peripheral surface (12) which makes an engagement with a tapered outer peripheral surface (28) of the shuttle member (23). A transmission member (29) is inserted into an upper portion of a cylindrical hole (21a) of the plug portion (21), while a rod (31) is inserted into a lower portion of the cylindrical hole (21a). When the rod (31) is driven downward for clamping, an output portion (36) of the rod (31) moves the work pallet (3) downward through engaging balls (34) to form a transmission gap (G) between a pushing portion (31a) of the upper end of the rod (31) and a pressure receiving portion (29b) of the transmission member (29). When the rod (31) is driven upwards for unclamping, the pushing portion (31a) pushes upwards the work pallet (3) through the transmission member (29).

10 Claims, 7 Drawing Sheets

CLAMPING DEVICE

TECHNICAL FIELD

The present invention relates to a clamping apparatus, and more particularly to an apparatus for strongly fixing a movable member such as a work pallet to a reference member such as a table of a machining center through a tapering engagement.

BACKGROUND ART

There is a conventional technique recited in Japanese Patent Public Disclosure No. 07-314270 as an example of the clamping apparatus of this type. This prior art is mainly used to detachably fix a pallet to an upper surface of a table of a machine tool, and constructed as follows.

An annular plug portion projects upwards from the table with a tapered outer peripheral surface which narrows toward its leading end. On the other hand, the palette is provided with a tapered inner peripheral surface which engages with the tapered outer peripheral surface of the plug portion. In the clamping operation, a rod inserted into the plug portion is driven upwards. Then, the output portion of the rod pushes the pallet downwards through a plurality of engaging balls so that the tapered inner peripheral surface of the pallet makes an engagement with the tapered outer peripheral surface of the plug portion.

In the case of the prior art, once the pallet makes a strong tapering engagement with the table in the clamping operation, it becomes too difficult to release the tapering engagement in the unclamping operation, and therefore the pallet cannot be separated from the table.

The present invention aims at providing a clamping apparatus with which a movable member such as a pallet can be easily separated from a reference member such as a table, and at manufacturing such a clamping apparatus in a compact design.

SUMMARY OF THE INVENTION

In order to accomplish the objectives mentioned above, the first invention provides a clamping apparatus as described below and as illustrated in FIG. 1 through FIG. 3, FIG. 4A, FIG. 4B, FIG. 5A, and FIG. 5B.

That is, in the clamping apparatus which detachably fixes a movable member (M) to a reference member (R), an annular plug portion 21 projects from the reference member (R) toward a leading end direction. And a tapered outer peripheral surface 28, 54 which narrows toward the leading end direction is arranged on the outer peripheral side of the plug portion 21. The movable member (M) is provided with a tapered inner peripheral surface 12, 53 which engages with the tapered outer peripheral surface 28, 54. A transmission member 29 is supported by a leading end of a cylindrical hole 21a of the plug portion 21 so as to be axially movable within a predetermined range, while a rod 31 is inserted in the cylindrical hole 21a so as to be axially movable, the latter located in a position closer to the reference member (R) than the transmission member 29. In the clamping operation, the rod 31 is driven toward a base end direction to the reference member (R) by a driving means (D) which is provided in the reference member (R), and an output portion 36 of the rod 31 moves the movable member (M) toward the reference member (R), and a transmission gap (G) is formed between a pushing portion 31a of a leading end of the rod 31 and a pressure receiving portion 29b of the transmission member 29. In the unclamping operation, the rod 31 is driven toward the leading end direction by the driving means (D), and the pushing portion 31a of the rod 31 pushes the movable member (M) through the transmission member 29.

In accordance with the first invention, in the unclamping operation, it is easy to separate the movable member from the reference member by releasing the tapering engagement between the tapered outer peripheral surface and the tapered inner peripheral surface by pushing the movable member with the rod through the transmission member.

In addition, since a transmission gap is formed between the pushing portion of the leading end of the rod and the pressure receiving portion of the transmission member in the clamping operation, in a contrary order, first of all, the rod runs toward the leading end direction through the transmission gap without any additional contact in the unclamping operation. Secondly, this operation makes the rod come in contact with the transmission member, and after that, the rod moves the transmission member toward the leading end direction. In other words, in the unclamping operation mentioned above, the distance of the movement of the transmission member, which moves toward the leading end direction, is to be the value which can be calculated by subtracting the distance of the transmission gap from the total distance by which the rod moves toward the leading end direction. Thus, the projecting distance of the transmission member can be reduced. As a result, the first invention has the advantage of manufacturing the clamping apparatus in a lower and compact design.

In addition, as illustrated in FIG. 2 or FIG. 4A, it is more advantageous that a fitting gap (alpha) is formed between the tapered outer peripheral surface 28, 54 and the tapered inner peripheral surface 12, 53 by pushing the movable member (M) with the rod 31 through the transmission member 29 in the unclamping operation.

With the fitting gap (alpha) formed in the unclamping operation as described above, the tapering engagement can be released without fail such that it gets easier to separate the movable member from the reference member.

Furthermore, in accordance with the present invention configured as described above, preferably, an annular shuttle member 23 which diametrically expands and contracts is provided with an inner peripheral surface fitted onto the plug portion 21 so as to axially reciprocate within a predetermined range and an outer peripheral surface serving as the tapered outer peripheral surface 28 while an advancing means 24 is provided to move the shuttle member 23 in such a direction as to tighten the tapering engagement.

Alternatively, in accordance with the present invention configured as described above, preferably, an annular shuttle member 23 which diametrically expands and contracts is provided with an outer peripheral surface fitted into the movable member (M) so as to axially reciprocate within a predetermined range and an inner peripheral surface serving as the tapered inner peripheral surface 53 while an advancing means 24 is provided to move the shuttle member 23 in such a direction as to tighten the tapering engagement.

Also, in order to accomplish the objectives mentioned above, the second invention provides a clamping apparatus as described below and as illustrated in FIG. 1 through FIG. 3, FIG. 4A, FIG. 4B, FIG. 5A, and FIG. 5B.

That is, in a clamping apparatus which fixes a surface (T) to be supported of a movable member (M) to a support surface (S) of a reference member (R) by aligning the movable member (M) with the reference member (R), a socket bore 11 is opened in the surface (T) to be supported of the movable member (M) to form a positioning hole 12 and an engaging hole 13 in this order from the opening edge of the socket bore 11. An annular plug portion 21 to be inserted into the socket bore 11 projects from the reference member (R) toward a leading end direction. A shuttle member 23 which diametrically expands and contracts is provided between the plug portion 21 and the positioning hole 12. The shuttle member 23 is supported by either the plug portion 21 or the positioning hole 12 so as to axially reciprocate within a predetermined range, and the shuttle member 23 makes a tapering engagement with the other. A tapered surface 28, 53 of the shuttle member 23 is formed to narrow toward the engaging hole 13, while an advancing means 24 is provided to move the shuttle member 23 in such a direction as to tighten the tapering engagement. A transmission member 29 is supported by a leading end of a cylindrical hole 21a of the plug portion 21 so as to be axially movable within a predetermined range, while a rod 31 is inserted in the cylindrical hole 21a so as to be axially movable, the latter located in a position closer to the reference member (R) than the transmission member 29. An engaging member 34 which is movable between a radially outward engaging position (X) and a radially inward disengaging position (Y) is arranged in the outer peripheral space of the rod 31. A driving means (D) provided in the reference member (R) drives the rod 31 for clamping in a direction toward the reference member (R), thereby enabling an output portion 36 of the rod 31 to switch over the engaging member 34 to the engaging position (X) for engaging the engaging member 34 with the engaging hole 13 to move the movable member (M) toward the reference member (R). On the other hand, a transmission gap (G) is formed between a pushing portion 31a of a leading end of the rod 31 and a pressure receiving portion 29b of the transmission member 29 in the clamping operation. In the unclamping operation, the driving means (D) drives the rod 31 toward the leading end direction, thereby allowing the engaging member 34 to switch over to the disengaging position (Y), at the same time the pushing portion 31a of the rod 31 pushes a top wall 11a of the socket bore 11 through the transmission member 29.

In accordance with the second invention, in the clamping operation, that is the movable member is clamped on the reference member, fist, the movable member automatically moves while aligning by a guide action of a tapered surface of a shuttle member to make an axis of a positioning hole of the movable member coincide with that of a plug portion of the reference member precisely. Second, the shuttle member compresses the advancing means and axially moves, thereby enabling the support surface of the reference member to receive the surface to be supported of the movable member, and the shuttle member comes in close contact with the positioning hole and the plug portion. Thus, the movable member is constrained by the plug portion through the shuttle member as well as by the support surface. As a result, the movable member can be precisely positioned and strongly fixed to the reference member.

In addition, in the unclamping operation mentioned above, the movable member can be easily separated from the reference member by pushing the top wall of the socket bore with the rod through the transmission member with the strong tapering engagement of the shuttle member released.

Furthermore, since a transmission gap is formed between the pushing portion of the leading end of the rod and the pressure receiving portion of the transmission member in the clamping operation, in a contrary order, first of all, the rod runs toward the leading end direction through the transmission gap without any additional contact in the unclamping operation. Secondly, this operation makes the rod come in contact with the transmission member, and after that, the rod moves the transmission member toward the leading end direction. In other words, in the unclamping operation mentioned above, the distance of the movement of the transmission member, which moves toward the leading end direction, is to be the value which can be calculated by subtracting the transmission gap from the total distance by which the rod moves toward the leading end direction. Thus, the projecting distance of the transmission member can be reduced. As a result, the second invention has the advantage of manufacturing the clamping apparatus in a lower and compact design.

In the configuration described above, it is more advantageous that a fitting gap (alpha) is formed on the tapered surface 28,53 of the shuttle member 23 by pushing the movable member (M) with the rod 31 through the transmission member 29, and that a contact gap (beta) is formed between the support surface S and the surface T to be supported.

As mentioned above, with the fitting gap on the tapered surface of the shuttle member and the contact gap between the support surface and the surface to be supported, both of which are formed in the unclamping operation, the tapering engagement can be released without fail such that the movable member can be easily separated from the reference member.

Furthermore, in the configuration described above, a resilient member 32 is preferably disposed between the rod 31 and the transmission member 29 to urge the transmission member 29 toward the leading end direction.

By this configuration, since it is possible in the last stage of the clamping operation that the leading end of the transmission member is in contact with the movable member by the resilient member, the height of the clamping apparatus can be reduced by enlarging the transmission gap. Furthermore, since it is possible to take advantage of at least one of the inner space of the transmission member and the inner space of the leading end of the rod as the space for the resilient member, the height of the clamping apparatus can be further reduced.

In addition to this advantage, in the configuration described above, it is preferred that the reference member (R) is provided with a supply port 41 for a cleaning fluid, that the transmission member 29 is provided with a blowout hole 42 for the cleaning fluid, and that the rod 31 is provided with a flow passage 44 through which the supply port 41 and the blowout hole 42 communicate with each other.

By this configuration, since the fitting gap and the contact gap between the reference member and the movable member can be cleaned by the cleaning fluid which is discharged through the blowout hole, these members can be engaged together without fail.

BRIEF DESCRIPTION OF THE DRAWINGS

FIG. 1 is a sectional view that a movable member starts to be attached to a reference member;

FIG. 2 shows that the movable member has been attached to the reference member and this figure is related to FIG. 1;

FIG. 3 shows that the movable member has been fixed to the reference member and this figure is related to FIG. 1;

FIG. 4A is a partial sectional view and is similar to FIG. 2;

FIG. 4B is a partial sectional view and is similar to FIG. 3;

FIG. 5A is a sectional view similar to FIG.1;

FIG. 5B is an enlarged view showing a main portion of FIG. 5A; and

BEST MODE FOR CARRYING OUT THE INVENTION

The present invention will be explained in detail in conjunction with the accompanied drawings.

Figure 1:
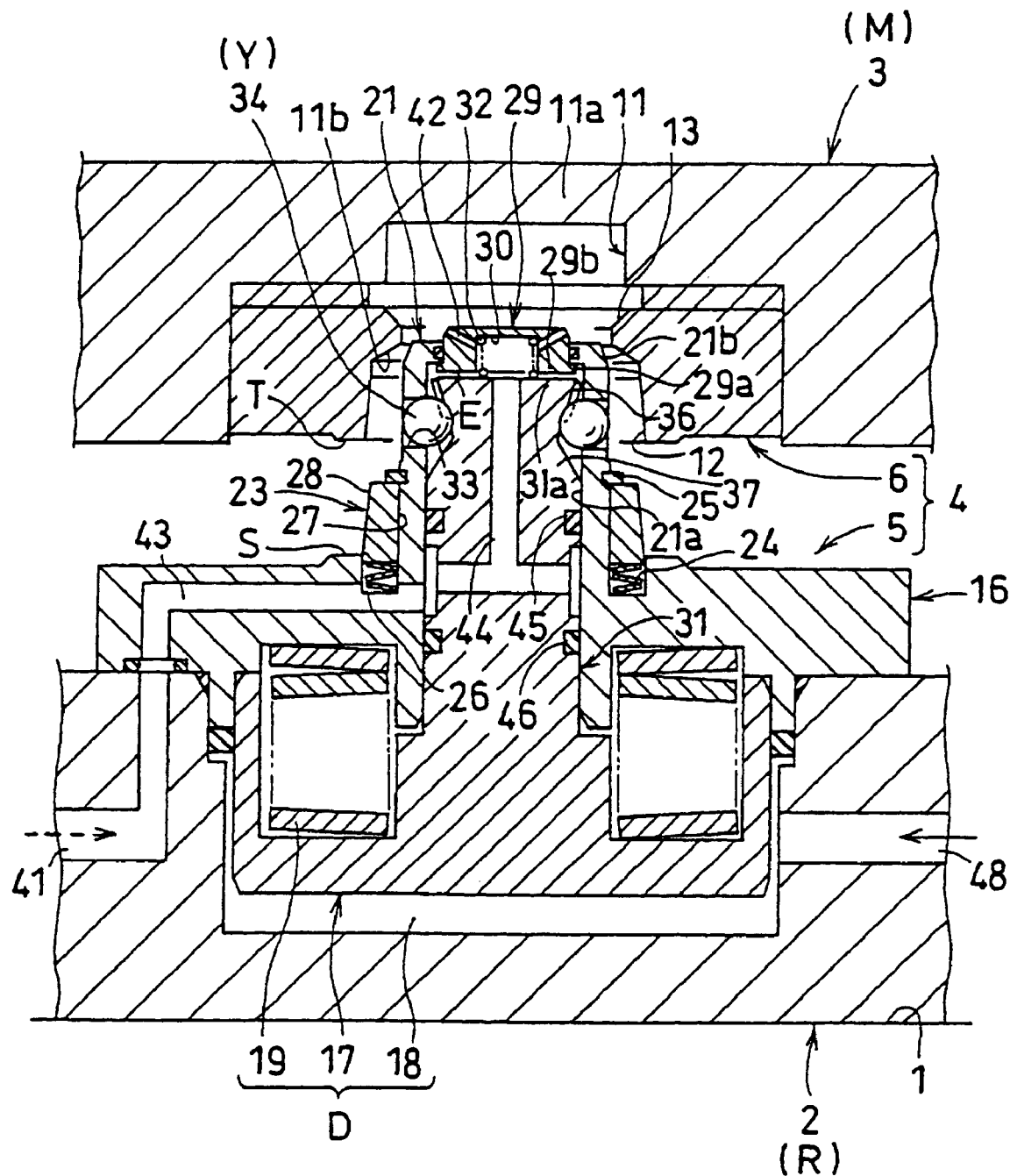
FIG. 1 through FIG. 3 show a first embodiment of the present invention.
Figure 2:
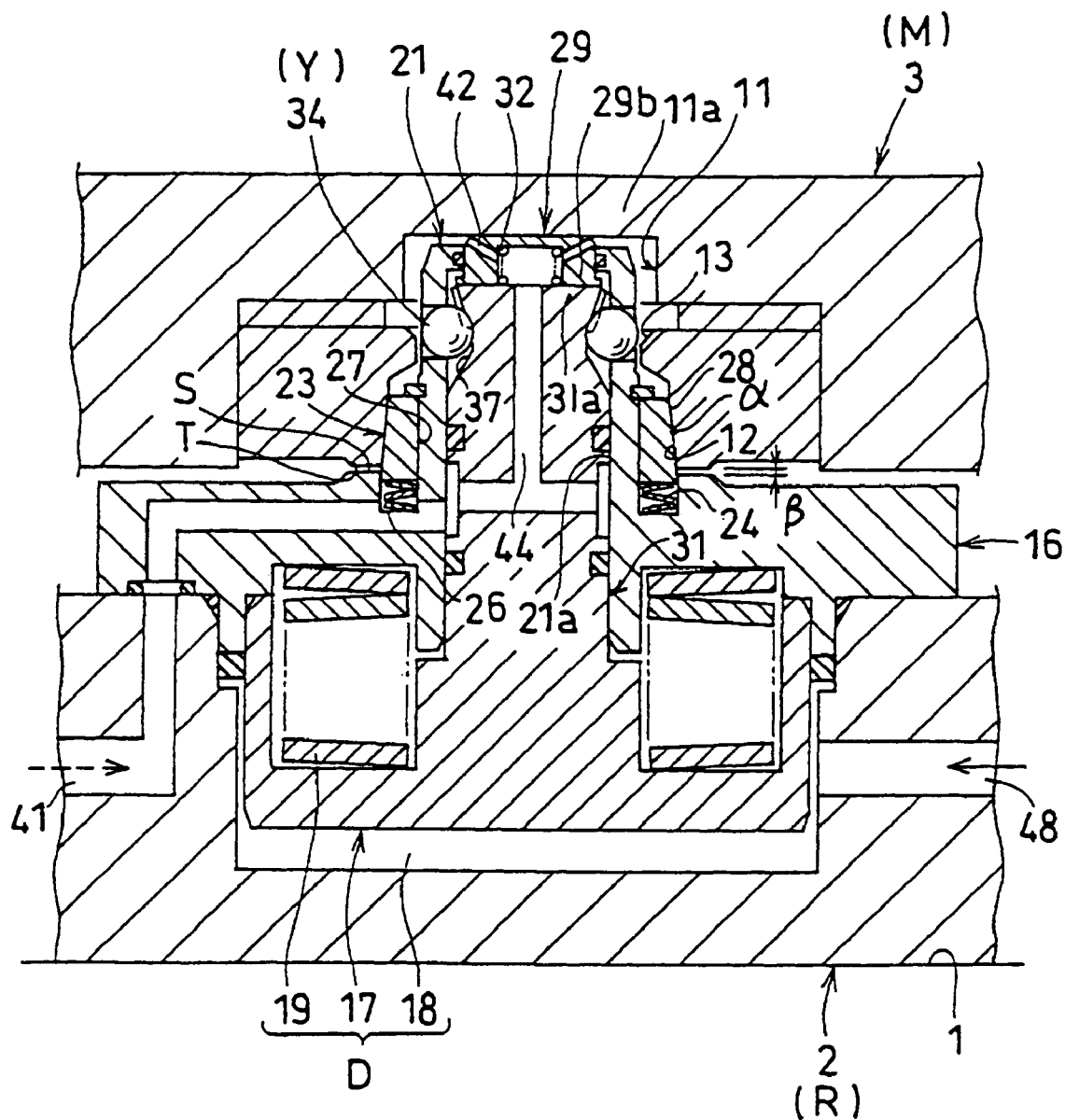
Figure 3:
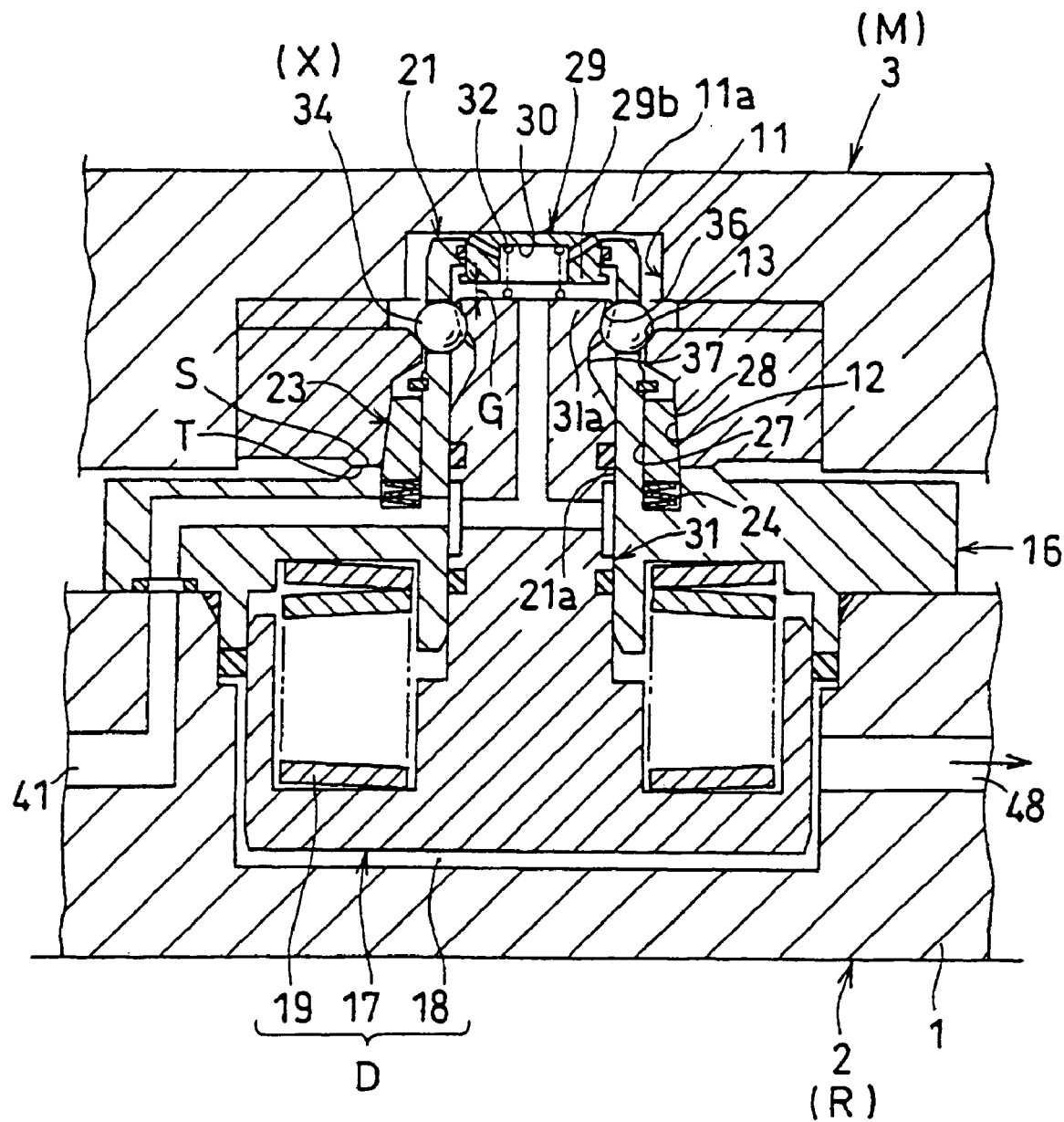

Here, a first embodiment will be explained with reference to FIG. 1 through FIG. 3. FIG. 1 is a sectional view that a movable member starts to be attached to a reference member. FIG. 2 shows that the movable member has been attached to the reference member. FIG. 3 shows that the movable member has been fixed to the reference member.

First, the structure of the clamping apparatus of the present invention will be explained with reference to FIG. 1.

A clamp pallet 2 of a reference member (R) is securely installed on an upper surface of a table 1 of a machining center. A work pallet 3 of a movable member (M) is fixed to the clamp pallet 2 by a plurality of clamping apparatuses 4 with datum function. In FIG. 1, one of the clamping apparatuses 4 is illustrated. Although not shown, a plurality of workpieces can be attached to and detached from an upper surface of the work pallet 3 by a work clamp.

The clamping apparatus 4 contains a datum clamp 5 fixed to the clamp pallet 2 through a plurality of bolts (not shown in FIG. 1) and a datum ring 6 fixed to the work pallet 3 through a plurality of bolts (not shown in FIG. 1).

The datum ring 6 has a mid portion projecting downwards, the bottom surface of which forms a surface (T) to be supported, while a socket bore 11 is opened in the surface (T) to be supported. The socket bore 11, which is composed of the datum ring 6 and the work pallet 3, contains the tapered positioning hole (tapered inner peripheral surface) 12 and a tapered engaging hole 13 in this order from the opening edge of the socket bore 11. While the tapered positioning hole 12 is formed to narrow upwardly, the tapered engaging hole 13 is formed to narrow downwardly.

The datum clamp 5 comprises a cover block 16 fixed to the clamp pallet 2, a piston 17 hermetically inserted between the cover block 16 and the clamp pallet 2, a hydraulic chamber 18 formed downwards of the piston 17, and a clamp spring 19 attached between the piston 17 and the cover block 16. Here the clamp spring 19 comprises a plurality of coned disc springs vertically superposed one on another, but it may comprise a compression coil spring.

The piston 17, the hydraulic chamber 18 and the clamp spring 19 compose a driving means (D).

The cover block 16 has a mid portion from which an annular plug portion 21 projects upwards, and the plug portion 21 is inserted into the socket bore 11. In a position radially outside of the lower section of the plug portion 21, the cover block 16 slightly projects upwards, of which this annular projection has an upper surface which forms a support surface (S).

The plug portion 21 has a lower half portion onto which an annular shuttle member 23 is fitted, and this shuttle member 23 is urged upwards through a plurality of coned disc springs (advancing means) 24 and restricted by a retaining ring 25. In the first embodiment, these coned disc springs 24 serve as an advancing means.

More specifically, the annular shuttle member 23 has an inner peripheral surface formed by a straight surface 27 and has an outer peripheral surface constructed by the tapered surface 28. The tapered surface (tapered outer peripheral surface) 28 and the straight surface 27 can diametrically expand and contract by providing slits in an annular wall of the shuttle member 23 or grooves in the inner peripheral surface thereof (either of which is not shown). The straight surface 27 is supported by an outer peripheral surface of the plug portion 21 so as to be axially movable. The tapered surface 28 is formed to narrow upwards so as to make a tapering engagement with the tapered positioning hole 12. Furthermore, an annular attachment groove 26 is formed in the cover block 16 along the outer periphery of the plug portion 21. The coned disc springs 24 are inserted into the annular attachment groove 26, and the lower portion of the shuttle member 23 is fitted into the groove 26.

A transmission member 29 is supported by the upper end portion of a cylindrical hole 21a of the plug portion 21 so as to be vertically movable within a predetermined range, and a rod 31 is inserted into the cylindrical hole 21a below the transmission member 29 such that it can move in the vertical direction. The lower portion of the rod 31 is connected to the piston 17.

The transmission member 29 is formed with a spring accommodation hole 30 having a top wall. An advancing spring (resilient member) 32 is arranged between the top wall of the transmission member 29 and the upper end surface of the rod 31. The transmission member 29 is urged upwards by the advancing spring 32, however, a flange 29a restricts the movement of the transmission member 29 not to exceed a predetermined range. On the situation that the movable member (M) is completely apart from the reference member (R) as shown in FIG. 1, a pressure receiving portion 29b, which is the lower end of the transmission member 29, is not in contact with the pushing portion 31a, which is the upper end of the rod 31, by the existence of a gap (E) between the two.

The plug portion 21 has an upper portion provided with a plurality of penetration holes 33 peripherally spaced at a regular interval. Each of the penetration holes 33 supports an engaging ball (engaging member) 34 so that the engaging ball 34 can move between a radially outward engaging position (X) (see FIG. 3) and a radially inward disengaging position (Y) (see FIG. 1).

The penetration hole 33 has a radially smaller portion (not shown in the figure) at its outer end so as to prevent the balls 34 from jumping out. An outer peripheral surface of the rod 31 has an upper portion at which an output surface (output portion) 36 for clamping and a retreat groove 37 for unclamping are formed with vertical continuity in correspondence with each of the balls 34.

Alternatively, both the rod 31 and the piston 17 may be separately formed and joined by bolts and the like, rather than integrally formed as illustrated.

Furthermore, there is provided a means which cleans the fitting surfaces of the clamping apparatus 4. More specifically, the clamp pallet 2 is provided with a supply port 41 for compressed air (which serves as the cleaning fluid) and the transmission member 29 is provided with a blowout hole 42 obliquely and upwardly at its upper portion. The supply port 41 communicates with the blowout hole 42 through a horizontal flow passage 43 within the cover bolt 16, a vertical flow passage 44 within the rod 31, and the spring accommodation hole 30. The vertical flow passage 44 is sealed by O-rings 45 and 46 which are arranged vertically. The horizontal flow passage 43 communicates with the annular attachment groove 26 at the middle.

It is sufficient if the blowout hole 42 is provided at one position while, preferably, the blowout hole 42 is provided at a plurality of positions which are peripherally spaced at a regular interval.

The clamping apparatus 4 operates in the following manner as shown in FIGS. 1 to 3.

In a state shown by FIG. 1, pressurized oil is supplied to the hydraulic chamber 18 through a pressurized oil supply and discharge passage 48. Thus, the hydraulic chamber 18 produces an oil pressure by which the piston 17 raises the rod 31 against the clamp spring 19 and each ball 34 faces the retreat groove 37 to be movable to the disengaging position (Y). In addition, the coned disc springs (advancing means) 24 hold the shuttle member 23 at a raised position.

And as shown in FIG. 1, while the work pallet 3 is descending toward the clamp pallet 2, a tapered guide hole 11b of the socked bore11 is guided by a tapered guide surface 21b of the plug portion 21, which results in making an axis of the socket bore 11 substantially coincide with that of the plug portion 21.

In the state shown by FIG. 1, first, the compressed air which serves as the cleaning means flows into the supply port 41, and then vigorously discharges out from the blowout hole 42. The discharged compressed air cleans a top surface and a peripheral surface of the socket bore 11 and thereafter blows downwards.

While the work pallet 3 is descending further, the tapered positioning hole 12 is guided by the tapered surface 28 of the shuttle member 23, and subsequently, as shown in FIG. 2, the socket bore 11 has a top wall 11a brought into contact with the pushing portion 31a of the rod 31 through the transmission member 29, thereby enabling the rod 31 to receive the work pallet 3.

In a state shown in FIG. 2, the compressed air discharged through the blowout hole 42 passes through the gap between the top wall 11a and the upper end surface of the plug portion 21, and subsequently cleans a surface of the engaging hole 13, a fitting gap (alpha) between the tapered surface 28 of the shuttle member 23 and the tapered positioning hole 12, and a contact gap (beta) between the support surface (S) and the surface (T) to be supported in order, thereafter the compressed air discharges outside.

Also, the compressed air supplied into the attachment groove 26 cleans a fitting gap of the straight surface 27 of the shuttle member 23 and a fitting gap of the lower portion of the tapered surface 28, thereafter discharges outside.

In the state shown in FIG. 2, the pressurized oil in the hydraulic chamber 18 discharging through the supply and discharge passage 48, the rod 31 strongly descends by the clamp spring 19 through the piston 17. Then, first, the work pallet 3 descends by its own weight following the descending rod 31 to bring the tapered positioning hole 12 into contact with the tapered surface 28 of the shuttle member 23. This allows the work pallet 3 to slightly compress the coned disc spring 24 through the shuttle member 23 and moves the tapered positioning hole 12 to make its axis coincide with that of the plug portion 21.

Substantially at the same time, as shown in FIG. 3, each output surface 36 of the rod 31 pushes each of the balls 34 to the radially outward engaging position (X), and the radial pushing force is converted to a downward force through the tapered engaging hole 13, such that the work pallet 3 descends by the strong downward force.

Then the tapered positioning hole 12 makes a strong tapering engagement with the tapered surface 28 of the shuttle member 23 resulting in being aligned, whereas this makes the axis of the tapered positioning hole 12 precisely coincide with that of the plug portion 21 and the shuttle member 23 further descends against the coned disc spring 24, thereby enabling the support surface (S) to receive the surface (T) to be supported. Thus the work pallet 3 is constrained horizontally through the shuttle member 23 which is radially contracted with the tapered positioning hole 12 by the plug portion 21 and vertically by the support surface (S), and as a result, the work pallet 3 can be precisely positioned and strongly fixed to the clamp pallet 2.

Then, in the clamping situation as illustrated in FIG. 3, there is formed a transmission gap (G) between the pushing portion 31a of the rod 31, that has descended by the piston 17, and the pressure receiving portion 29b of the transmission member 29, that has descended by the work pallet 3.

To start unclamping operation (see FIG. 2 and FIG. 3), the pressurized oil is supplied to the hydraulic chamber 18 shown in FIG. 3 to make the rod 31 ascend by the piston 17. That is, the rod 31 runs upwards through the transmission gap (G) without any additional contact, thereafter each of the balls 34 is allowed to face the retreat groove 37 to switch over to the disengaging position (Y) (the balls 34 already switched over in this figure), and the rod 31 is brought into contact with the top wall 11a of the socket bore 11 through the transmission member 29 to push up the work pallet 3. Thereby, as illustrated in FIG. 2, there are the fitting gap (alpha) formed on an upper side of the shuttle member 23 and the contact gap (beta) on an upper side of the support surface (S). In consequence, the work pallet 3 can be easily removed from the clamp pallet 2.

In the unclamping operation mentioned above, the distance of the movement of the transmission member 29, which moves upwards, is to be the value which can be calculated by subtracting the distance of the transmission gap (G) (see FIG. 3) from the total distance by which the rod 31 moves upwards. Thus, the projecting distance of the transmission member 29 can be reduced. Therefore, the height of the socket bore 11 can be also reduced.

Accordingly, the clamping apparatus 4 can be manufactured in a lower and compact design.

Alternatively, the plurality of superposed coned disc springs 24 urging the shuttle member 23 may be replaced with a single spring, and further they may be replaced with a compression coil spring or the like other kinds of springs or rubber.

Figure 4A:
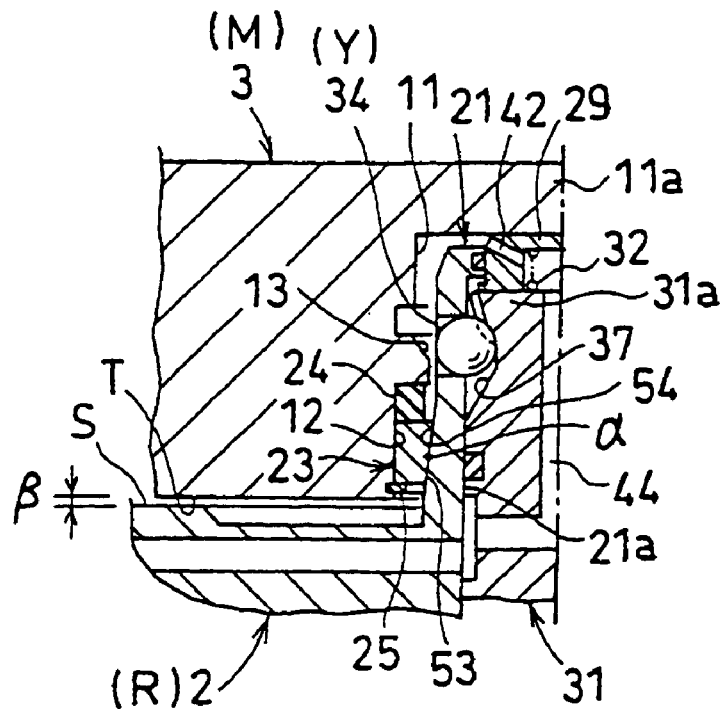
FIG. 4A and FIG. 4B show a second embodiment of the present invention.
Figure 4B:
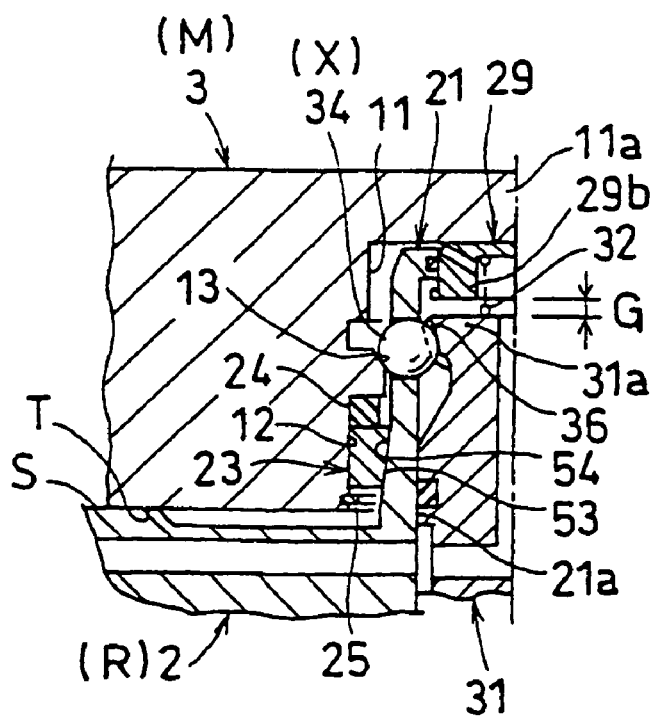

FIG. 4A and FIG. 4B show a second embodiment of the present invention. FIG. 4A is a partial sectional view showing that the work pallet 3 has been attached to the clamp pallet 2 and similar to FIG. 2. FIG. 4B is a partial sectional view showing that the work pallet 3 has been fixed to the clamp pallet 2 and this figure is similar to FIG. 3.

In this second embodiment, the same constituent members as those in the first embodiment are, in principle, designated by the same characters, and then explanation is limited to a construction different from that of the first embodiment.

The positioning hole 12 of the socket bore 11 formed in the work pallet 3 is straight. The straight surface on a periphery of the shuttle member 23 is vertically movable and supported by the straight positioning hole 12. The shuttle member 23 is urged downwards by the resilient member 24 made of rubber, and the descendant is restricted by the retaining ring 25 fitted into a lower portion of the positioning hole 12. Incidentally, the resilient member 24 can be composed of a spring instead of rubber.

The shuttle member 23 has an inner surface formed with a tapered surface (tapered inner surface) 53, which makes a tapering engagement with a tapered outer peripheral surface 54 of the plug portion 21. The tapered surface 53 is formed so as to narrow upwardly.

Figure 5A:
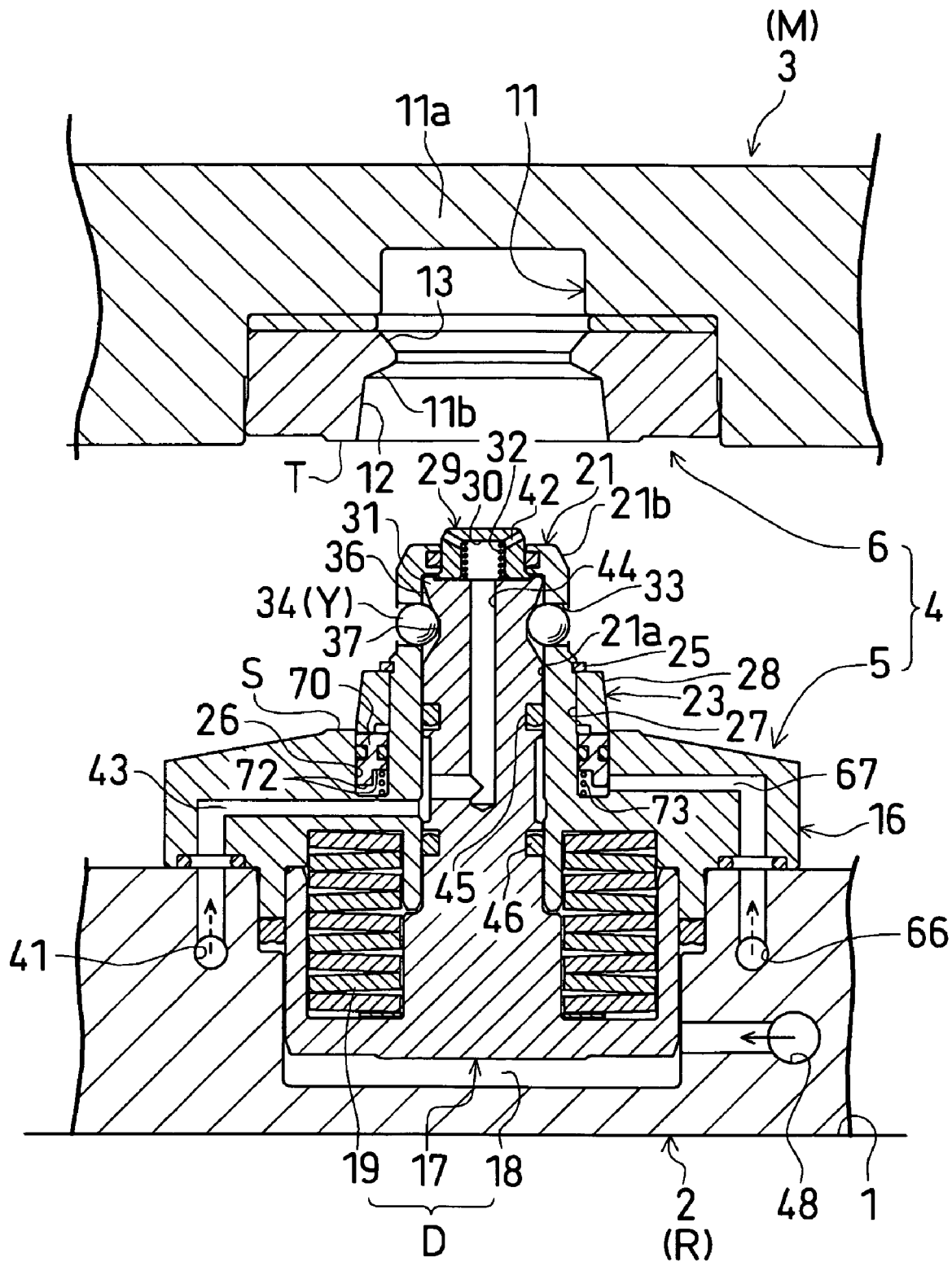
FIG. 5A and FIG. 5B show a third embodiment of the present invention.
Figure 5B:
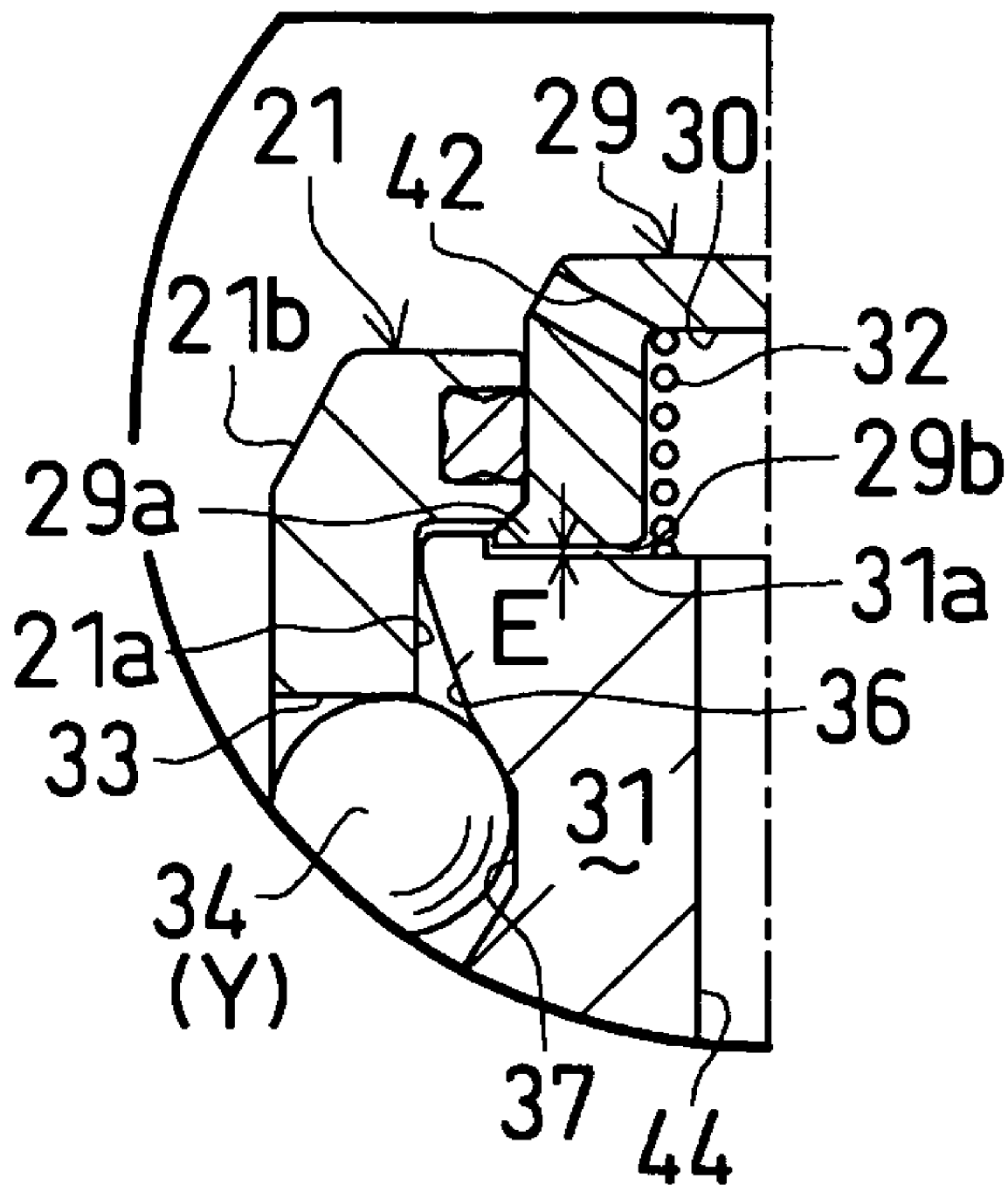

FIG. 5A and FIG. 5B show a third embodiment of the present invention. FIG. 5A is a sectional view similar to FIG. 1. FIG. 5B is an enlarged view showing a main portion of FIG. 5A. In the third embodiment, the same constituent members as those in the first embodiment are, in principle, designated by the same characters, and constructions which differs from that of the first embodiment will be explained In the third embodiment, an annular piston 70 which serves as an advancing means is provided below the shuttle member 23. More specifically, the annular piston 70 is hermetically fitted into the attachment groove 26 formed in the cover block 16 such that the annular piston 70 is vertically movable.

In order to supply compressed air which pushes the annular piston 70 upwards, a second supply port 66 is provided in the clamp pallet 2. This second supply port 66 communicates with the lower portion of the attachment groove 26 through a second horizontal flow passage 67 which is formed in the cover block 16. The annular piston 70 has a pressure receiving surface 72 at its bottom surface which receives the pressure of the compressed air supplied from the second supply port 66. The second supply port 66 is connected to pressure control means (for example, a pressure regulation valve) through an appropriate piping, which is not shown in the figure, and serves to control the pressure of the compressed air exerted upon the pressure receiving surface 72.

In addition, a raising spring 73 is provided in the lower side of the annular piston 70. This raising spring 73 serves to urge the shuttle member 23 upwards through the annular piston 70. However, the spring force of this raising spring 73 is intentionally weaker than the spring force of the coned disc springs 24 introduced in the first embodiment.

In accordance with the configuration of this third embodiment, as mentioned above, the pressure receiving surface 72 which receives the pressure of the compressed fluid is formed on the annular piston 70 which serves to push and move the shuttle member 23. In other words, the annular piston 70 applies a pushing and moving force to the shuttle member 23 by receiving the pressure of the compressed air supplied from the second supply port 66 through the pressure receiving surface 72 such that the shuttle member 23 ascends (i.e., the direction to tighten the tapering engagement between the tapered surface 28 and the positioning hole 12).

Accordingly, in contrast to the first embodiment in which the advancing force of the shuttle member 23 is dominated by the resilient force of the coned disc springs 24 resulting in being unchangeable, in the third embodiment the advancing force of the shuttle member 23 can be easily adjusted by controlling the supply and discharge of the compressed air at the second supply port 66.

For example, in the case of the third embodiment, the following control is possible. That is, on starting the unclamping operation, the advancing force of the shuttle member 23 can be reduced by discharging the compressed air through the second supply port 66. That prevents the work pallet 3 from being strongly pushed and being flipped up by the shuttle member 23 just after releasing the work pallet 3 from the vertical constraint. That's why the work pallet 3 and a workpiece on the work pallet 3 do not suffer from unexpected impact in the third embodiment.

In addition, the following control is effective for the attaching between the work pallet 3 and the clamp pallet 2 in the third embodiment. Namely, in the condition that the support surface (S) and the surface (T) to be supported are separated, the pressure is supposed to be released from the second supply port 66. Next, the work pallet 3 is controlled to descend. Then, the positioning hole 12 makes a slight tapering engagement with the shuttle member 23, which is urged upwards by a slight force of the raising spring 73, to make the shuttle member 23 descend. Successively, the support surface (S) and the surface (T) to be supported come in contact with each other. Thereafter, compressed air is supplied to the second supply port 66 to raise the pressure to make the shuttle member 23 advance through the annular piston 70 and to make a strong tapering engagement between the tapered surface portion 28 of the shuttle member 23 and the positioning hole 12. By this configuration, the work pallet 3 is constrained horizontally by the plug portion 21 through the tapered positioning hole 12 and the shuttle member 23, which is radially contracted by the strong tapering engagement.

Meanwhile, with the raising spring 73, it is possible to maintain the shuttle member 23 at an upper position even when the compressed air is not supplied against the annular piston 70 (i.e., when the pressure is released from the second supply port 66).

Thereby, since the upper end surface of the shuttle member 23 is in contact with the retaining ring 25 without any gap, foreign objects such as chip shall not enter between the straight surface 27 of the shuttle member 23 and the outer peripheral surface of the plug portion 21. Incidentally, this raising spring 73 can be replaced with a rubber member and the like. Also, the raising spring 73 can be omitted depending upon the configuration of the clamping system.

Furthermore, instead of the compressed air exemplified, pressurized oil and another suitable fluid can be used as a pressurized fluid to be supplied and be discharged through the second supply port 66.

Figure 6A:
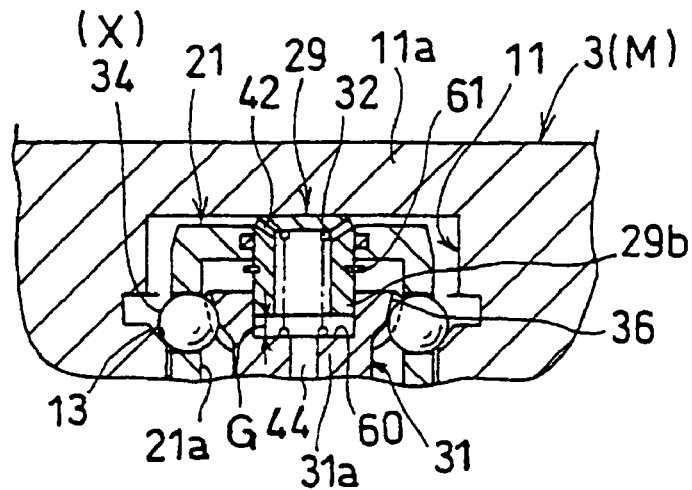
FIG. 6A through FIG. 6C are partial sectional views showing a first through a third exemplary variation respectively, those of which are similar to FIG. 3.
Figure 6B:
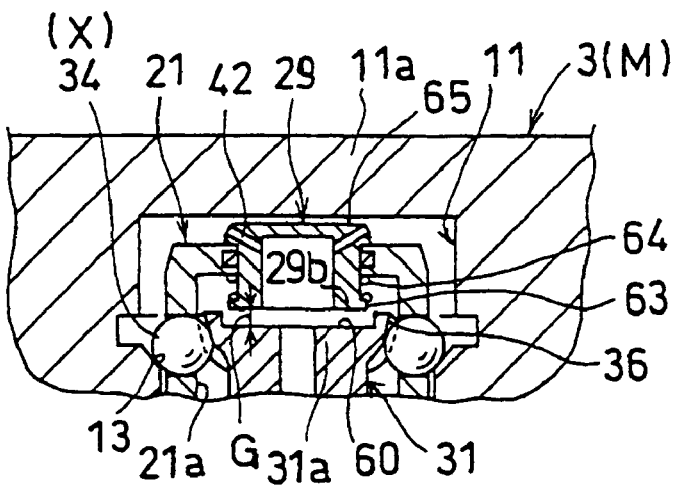
Figure 6C:
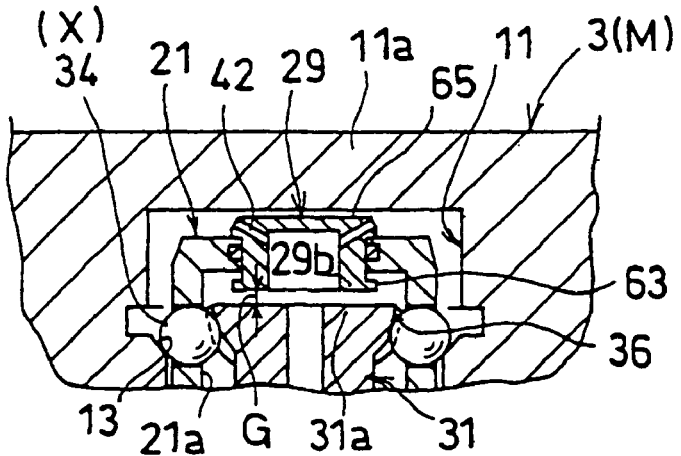

FIG. 6A through FIG. 6C are partial sectional views showing a first through a third exemplary variation, respectively, which are similar to FIG. 3, showing that the work pallet 3 has been fixed to the clamp pallet (not shown in the figure). Incidentally, also in these exemplary variations, the same constituent members as those in the first embodiment are, in principle, designated by the same characters, and constructions which differ from that of the first embodiment are explained here.

The first exemplary variation of FIG. 6A is constructed as follows.

The transmission member 29 has a lower portion which is inserted into an accommodation hole 60 formed in an upper portion of the rod 31. The pushing portion 31a is formed by the bottom wall of the accommodation hole 60, and the pressure receiving portion 29b is formed by the lower portion of the transmission member 29. The transmission member 29 is provided with a retaining ring 61 to prevent the transmission member 29 from moving upwards beyond a predetermined range by the advancing spring (resilient member) 32.

The second exemplary variation of FIG. 6B is formed from the first exemplary variation of FIG. 6A with the following modification. That is, a retraction spring 64 is provided between the upper portion of the plug portion 21 and the lower flange 63 of the transmission member 29 in order to urge the transmission member 29 downward. An upper flange 65 prevents the transmission member 29 from moving downward beyond a predetermined range.

The third exemplary variation of FIG. 6C is formed by omitting the retraction spring 64 illustrated in FIG. 6B, and the transmission member 29 is prevented from moving beyond a predetermined range by an upper flange 65 and a lower flange 63.

The respective embodiments and the respective exemplary variations can be modified as follows.

The reference member (R) may be a table of a machining center or various machines instead of the exemplified clamp pallet 2. Also, the movable member (M) may be a workpiece instead of the exemplified work pallet 3. The reference member (R) and the movable member (M) may be arranged in a vertically reversed manner and may be connected to each other horizontally or obliquely instead of vertically as exemplified.

Further, it is a matter of course that a clamping apparatus of the present invention can be used to clamp not only the work pallet and the workpiece but also a metal die, an attachment or the like. The clamping apparatus can be employed not only in plural sets but also in only one single set.

Besides, the shuttle member 23 of the clamping apparatus may be composed of not only the exemplified annular integral structure but a plurality of divided portions arranged annularly.

In addition, the engaging member 34 of the clamping apparatus may be a collet which engages with the straight engaging hole by a frictional force or a plastic deformation force instead of the exemplified ball which engages with the tapered engaging hole. The clamping apparatus may be driven for clamping through fluid pressure force such as oil pressure and air pressure instead of the spring force.

The shuttle member 23 may be omitted. In this case, in the case of the first embodiment as illustrated in FIG. 1 through FIG. 3, the tapered outer peripheral surface 28 is formed integrally with the outer peripheral surface of the plug portion 21, while in the case of the second embodiment as illustrated in FIG. 4A and FIG. 4B, the tapered inner peripheral surface 53 is formed integrally with the socket bore 11.

Both The tapered outer peripheral surface 28 formed integrally with the plug portion 21 and the tapered inner peripheral surface 53 formed integrally with the socket bore 11 are preferably formed to permit elastic deformation in the axial and radial directions, for example, by providing a hollow portion therein.

The invention claimed is:

1. A clamping apparatus for detachably fixing a movable member (M) to a reference member (R), comprising:
an annular plug portion (21) having an outer peripheral side and projecting from said reference member (R) toward a leading end direction, and having a tapered outer peripheral surface (28, 54) which narrows toward the leading end direction arranged on the outer peripheral side of the plug portion (21); said movable member (M) provided with a tapered inner peripheral surface (12, 53) configured to engage the tapered outer peripheral surface (28, 54);
a transmission member (29) supported within a leading end of a cylindrical opening (21a) in the plug portion (21) so as to be axially movable within the opening over a predetermined range; a rod (31) located in the cylindrical opening (21a) so as to be axially movable therein, the rod being located in a position closer to a base end of the reference member (R) than is the transmission member (29)
whereby during a clamping operation, the rod (31) may be driven toward the base end direction of the reference member (R) by a driving device (D) provided in the reference member (R), said rod (31) having an output portion (36) arranged to move the movable member (M) toward the reference member (R); a transmission gap (G) formed between a pushing portion (31a) of a leading end of the rod (31) and a force receiving portion (29b) of the transmission member (29);
whereby during a an unclamping operation, the rod (31) may be driven toward the leading end direction by the driving device (D), such that the pushing portion (31a) of the rod (31) pushes the movable member (M) via the transmission member (29).

2. The clamping apparatus as set forth in claim 1, wherein said rod (31) is arranged to push the movable member (M) via the transmission member (29) to form a fitting gap (alpha) between the tapered outer peripheral surface (28, 54) and the tapered inner peripheral surface (12, 53) during an the unclamping operation.

3. The clamping apparatus as set forth in claim 1, including
an annular shuttle member (23), which is diametrically expandable and contractable, is provided with an inner peripheral surface fitted onto the plug portion (21) so as to axially reciprocate relative to the plug portion over a predetermined range, said outer peripheral surface of the shuttle member (23) serving as said tapered outer peripheral surface (28); and
an advancing device (24) arranged to move the shuttle member (23) in such a direction as to tighten the tapering engagement.

4. The clamping apparatus as set forth in claim 1, including
an annular shuttle member (23), which is diametrically expandable and contractable, and having an outer peripheral surface fitted into the movable member (M) so as to axially reciprocate within the movable member over a predetermined range, said inner peripheral surface of the shuttle member (23) serving as said tapered inner peripheral surface (53), and
an advancing device (24) arranged to move the shuttle member (23) in such a direction as to tighten the tapering engagement.

5. A clamping apparatus for fixing a surface (T) of a movable member (M) to be supported relative to a support surface (S) of a reference member (R) with alignment of the movable member (M) with the reference member (R), comprising
a socket bore (11) in the surface (T) of a the movable member (M) to be supported to define a positioning hole (12) and an engaging hole (13) in the recited order outwardly of the opening edge of the socket bore (11);
an annular plug portion (21) inserted into the socket bore (11) and projecting from the reference member (R) toward a leading end direction,
a shuttle member (23), which is diametrically expandable and contractable arranged between the plug portion (21) and the positioning hole (12); said shuttle member (23) supported by either the plug portion (21) or the positioning hole (12) so as to be axially reciprocable over reciprocate within a predetermined range; said shuttle member (23) making a tapering engagement with the positioning hole 12 or the plug portion (21);

and a tapered surface (28, 53) of the shuttle member (23) formed to narrow toward the engaging hole (13); an advancing device (24) arranged to move the shuttle member (23) in a direction so as to tighten the tapering engagement;

a transmission member (29) supported within a leading end of a cylindrical hole (21a) in the plug portion (21) so as to be axially movable therein within a predetermined range; a rod (31) located within the cylindrical hole (21a) so as to be axially movable thereon; the rod being located in a position closer to a base end of the reference member (R) than is the transmission member (29);

an engaging member (34) movable between a radially outward engaging position (X) and a radially inward disengaging position (Y) arranged on the outer peripheral area of the rod (31), a driving device (D) provided on the reference member (R) arranged to drive the rod (31) in a direction toward the base end direction of the reference member (R), to thereby enable an output portion (36) of the rod (31) to move the engaging member (34) to the engaging position (X) for engaging the engaging member (34) with the engaging hole (13) to move the movable member (M) toward the reference member (R) during a clamping operation; and a transmission gap (G) provided between a pushing portion (31a) of a leading end of the rod (31) and a pressure receiving portion (29b) of the transmission member (29) during a the clamping operation;

said driving device (D) arranged to drive the rod (31) toward the leading end direction, to thereby enable the engaging member (34) to move to the disengaging position (Y), such that the pushing portion (31a) of the rod (31) pushes a top wall (11a) of the socket bore (11) via the transmission member (29) during an unclamping operation.

6. The clamping apparatus as set forth in claim 5 wherein, said rod (31) is arranged to push the movable member (M) via the transmission member (29) to form a fitting gap (alpha) on the tapered surface (28,53) of the shuttle member (23) and a contact gap (beta) between the support surface (S) and the surface (T) to be supported.

7. The clamping apparatus as set forth in claim 1, including a resilient member (32) disposed between the rod (31) and the transmission member (29) and arranged to urge the transmission member (29) toward the leading end direction.

8. The clamping apparatus as set forth in claim 1, wherein the reference member (R) includes a supply port (41) for a cleaning fluid, and the transmission member (29) includes a blowout hole (42) for exiting the cleaning fluid; and said rod (31) is provided with a flow passage (44) through which the supply port (41) and the blowout hole (42) communicate with each other.

9. The clamping apparatus as set forth in claim 5, including a resilient member (32) disposed between the rod (31) and the transmission member (29) and arranged to urge the transmission member (29) toward the leading end direction.

10. The clamping apparatus as set forth in claim 5, wherein the reference member (R) includes a supply port (41) for a cleaning fluid, and the transmission member (29) includes a blowout hole (42) for exiting the cleaning fluid; and said rod (31) is provided with a flow passage (44) through which the supply port (41) and the blowout hole (42) communicate with each other.

* * * * *